US012175920B2

(12) United States Patent
Li

(10) Patent No.: US 12,175,920 B2
(45) Date of Patent: Dec. 24, 2024

(54) ORGANIC LIGHT-EMITTING DIODE (OLED) DISPLAY CAPABLE OF INCREASING THE NUMBER OF BRIGHTNESS ADJUSTABLE LEVELS

(71) Applicant: TCL CHINA STAR OPTOELECTRONICS TECHNOLOGY CO., LTD., Shenzhen (CN)

(72) Inventor: Wenfang Li, Shenzhen (CN)

( * ) Notice: Subject to any disclaimer, the term of this patent is extended or adjusted under 35 U.S.C. 154(b) by 0 days.

(21) Appl. No.: 17/422,214

(22) PCT Filed: May 31, 2021

(86) PCT No.: PCT/CN2021/097202
§ 371 (c)(1),
(2) Date: Jul. 12, 2021

(87) PCT Pub. No.: WO2022/241827
PCT Pub. Date: Nov. 24, 2022

(65) Prior Publication Data

US 2024/0021140 A1 Jan. 18, 2024

(30) Foreign Application Priority Data

May 19, 2021 (CN) ......................... 202110544641.3

(51) Int. Cl.
*G09G 3/32* (2016.01)

(52) U.S. Cl.
CPC ....... *G09G 3/32* (2013.01); *G09G 2320/0626* (2013.01)

(58) Field of Classification Search
CPC .......... G09G 3/30; G09G 3/32; G09G 3/3208; G09G 3/3216; G09G 3/3225; G09G 3/3233; G09G 3/3241; G09G 3/325; G09G 3/3258; G09G 3/3266; G09G 3/3275; G09G 3/3283; G09G 3/3291; G09G 2320/062;
(Continued)

(56) References Cited

U.S. PATENT DOCUMENTS

2005/0024320 A1* 2/2005 Nowatzyk .............. G09G 3/005 345/108
2005/0179629 A1* 8/2005 Inoue .................. H05B 45/395 345/82
(Continued)

FOREIGN PATENT DOCUMENTS

CN 101505154 A 8/2009
CN 104882094 A 9/2015
(Continued)

*Primary Examiner* — Ke Xiao
*Assistant Examiner* — Nelson Lam

(57) ABSTRACT

The present application discloses a driving circuit, a display panel and an electronic device. The driving circuit includes a voltage output module, a light-emitting device connected between the voltage output module and a second voltage terminal, and a brightness adjusting module connected between the light-emitting device and the voltage output module. In a light-emitting phase, the brightness adjusting module controls a frequency a first voltage signal outputted by the voltage output module applies to the light-emitting device such that the light-emitting device is changed between a light-emitting state and a non-light-emitting state.

16 Claims, 5 Drawing Sheets

(58) Field of Classification Search
CPC ... G09G 2320/0626; G09G 2320/0633; G09G 2320/064
USPC .......................................................... 345/76–83
See application file for complete search history.

(56) References Cited

U.S. PATENT DOCUMENTS

| | | | | |
|---|---|---|---|---|
| 2006/0109217 | A1* | 5/2006 | Hu | G09G 3/3208 345/77 |
| 2008/0001860 | A1* | 1/2008 | Chen | G09G 3/3241 345/77 |
| 2008/0284693 | A1* | 11/2008 | Sarma | G09G 3/3233 345/82 |
| 2009/0147028 | A1* | 6/2009 | Sefton | G06F 3/1446 345/82 |
| 2011/0134023 | A1* | 6/2011 | Feng | G09G 3/3406 345/102 |
| 2013/0208030 | A1* | 8/2013 | Sarrasin | G09G 3/3208 345/691 |
| 2014/0225939 | A1* | 8/2014 | Hasegawa | G09G 3/3225 345/76 |
| 2014/0333682 | A1* | 11/2014 | Okuno | G09G 3/3233 345/80 |
| 2015/0077413 | A1* | 3/2015 | Kim | G09G 3/3233 345/212 |
| 2015/0138258 | A1* | 5/2015 | Lee | G09G 3/3225 345/691 |
| 2020/0045791 | A1 | 2/2020 | Gredler et al. | |

FOREIGN PATENT DOCUMENTS

| | | | |
|---|---|---|---|
| CN | 110675806 | A | 1/2020 |
| CN | 110706652 | A | 1/2020 |

* cited by examiner

ORGANIC LIGHT-EMITTING DIODE (OLED) DISPLAY CAPABLE OF INCREASING THE NUMBER OF BRIGHTNESS ADJUSTABLE LEVELS

FIELD OF THE DISCLOSURE

The present application relates to display technologies, and more particularly to a driving circuit, a display panel and an electronic device.

DESCRIPTION OF RELATED ARTS

The larger the number of bits, the more brightness levels of a light-emitting device and the more beneficial to the display effect. In an existing driving circuit, it is only possible to use data signals to realize brightness control of the light-emitting device. It is difficult to further increase brightness levels of the light-emitting device.

SUMMARY

Technical Problems

Embodiments of the present application provides a driving circuit, a display panel and an electronic device, capable of increasing the number of brightness adjustable levels of a light-emitting device.

Technical Solutions

An embodiment of the present application provides a driving circuit including a voltage output module, a light-emitting device and a brightness adjusting module. The voltage output module is configured to output a first voltage signal; the light-emitting device is electrically connected between the voltage output module and a second voltage terminal; and the brightness adjusting module is electrically connected between the light-emitting device and the voltage output module and is configured to control a frequency the first voltage signal applies to the light-emitting device in a light-emitting phase to adjust average brightness of the light-emitting device.

Optionally, in some embodiments of the present application, the brightness adjusting module includes a first transistor and a control unit. One of a source and a drain of the first transistor is electrically connected to the light-emitting device and the other one of the source and the drain of the first transistor is electrically connected to the voltage output module; the control unit is electrically connected to a gate of the first transistor.

Optionally, in some embodiments of the present application, the control unit includes a second transistor and a control circuit. One of the source and the drain of the second transistor is connected to the gate of the first transistor and the other one of the source and the drain of the second transistor is connected to a third voltage terminal; the control circuit is electrically connected to the gate of the second transistor.

Optionally, in some embodiments of the present application, the brightness adjusting module further includes a first resistor connected in series between the voltage output module and the gate of the first transistor.

Optionally, in some embodiments of the present application, the brightness adjusting module further includes a second resistor connected in series between the light-emitting device and the second voltage terminal and between the first transistor and the second voltage terminal.

Optionally, in some embodiments of the present application, the brightness adjusting module further includes a third transistor, one of the source and the drain of the third transistor is electrically connected to the light-emitting device and the other one of the source and the drain of the third transistor is connected to the second voltage terminal, and the third transistor is configured to make voltages at two ends of the light-emitting device be equal to each other.

Optionally, in some embodiments of the present application, the driving circuit further includes a light-emitting control module including a drive transistor and a data transistor. One of a source and a drain of the drive transistor is electrically connected to the light-emitting device and the other one of the source and the drain of the drive transistor is connected to the second voltage terminal; one of the source and the drain of the data transistor is connected to a gate of the drive transistor and the other one of the source and the drain of the data transistor is connected to a data line, and the gate of the data transistor is electrically connected to a scan line.

Optionally, in some embodiments of the present application, the light-emitting device includes an organic light-emitting diode (OLED), a mini light-emitting diode (LED) or a micro LED.

Optionally, in some embodiments of the present application, the second voltage terminal is a common grounded terminal or a power supply terminal of a device.

Optionally, in some embodiments of the present application, the control unit includes a Field-Programmable Gate Array (FPGA).

Optionally, in some embodiments of the present application, the control circuit is electrically connected to the gate of the third transistor, and the second transistor is one of a P-type transistor and a N-type transistor and the third transistor is the other one of the P-type transistor and the N-type transistor.

The present application further provides a display panel including any of the afore-described driving circuits.

Optionally, in some embodiments of the present application, the display panel further includes a backlight module including the light-emitting device.

Optionally, in some embodiments of the present application, the display panel further includes a panel body including the light-emitting device.

The present application further provides an electronic device including any of the afore-described driving circuits or any of the afore-described display panels.

Beneficial Effects

Compared to the existing arts, in the driving circuit, the display panel and the electronic device provided in the present application, the driving circuit includes a voltage output module, a light-emitting device and a brightness adjusting module. The voltage output module is configured to output a first voltage signal; the light-emitting device is electrically connected between the voltage output module and a second voltage terminal; and the brightness adjusting module is electrically connected between the light-emitting device and the voltage output module and is configured to control a frequency the first voltage signal applies to the light-emitting device in a light-emitting phase to make the light-emitting device change between a light-emitting state and a non-light-emitting state. On a basis of certain brightness levels the light-emitting device originally have in the light-emitting phase, average brightness of the light-emitting device is further adjusted and the number of brightness adjustable levels of the light-emitting device increases.

DESCRIPTION OF EMBODIMENTS OF THE DISCLOSURE

To make the objectives, technical schemes, and effects of the present application more clear and specific, the present application is described in further detail below with reference to the embodiments in accompanying with the appending drawings. It should be understood that the specific embodiments described herein are merely for interpreting the present application and the present application is not limited thereto.

Specifically, FIGS. 1A to 1F are structural schematic diagrams illustrating driving circuits provided in embodiments of the present application. The present application provides a driving circuit. Optionally, the driving circuit is a pixel driving circuit or a backlight driving circuit.

The driving circuit includes a light-emitting device D1, a voltage output module 100 and a brightness adjusting module 200.

Optionally, the light-emitting device D1 includes an organic light-emitting diode (OLED), a mini light-emitting diode (LED) or a micro LED.

The brightness adjusting module 200 and the light-emitting device D1 are electrically connected between the voltage output module 100 and a second voltage terminal VE2. The voltage output module 100 is configured to output a first voltage signal V1. The first voltage signal V1 is a direct-current (DC) voltage signal. The second voltage terminal VE2 is configured to provide a second voltage signal V2. The voltage value of the second voltage signal V2 is different from the voltage value of the first voltage signal V1.

For more details, the light-emitting device D1 is electrically connected to the second voltage terminal VE2. The brightness adjusting module 200 is electrically connected between the light-emitting device D1 and the voltage output module 100 such that the brightness adjusting module 200 realizes an electrical connection between the light-emitting device D1 and the voltage output module 100.

Optionally, the second voltage terminal V2 can be a common grounded terminal VSS and can also be a power supply terminal VDD of a device.

Figure 1A:
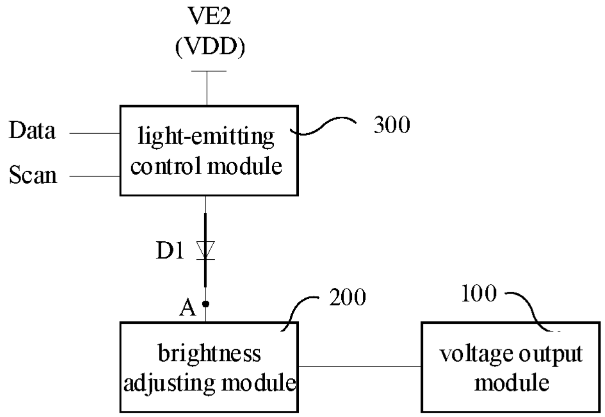
FIGS. 1A to 1F are structural schematic diagrams illustrating driving circuits provided in embodiments of the present application.

For more details, if the second voltage terminal VE2 is the power supply terminal VDD of the device, an anode of the light-emitting device D1 is electrically connected to the power supply terminal VDD of the device, a cathode of the light-emitting device D1 is electrically connected to the brightness adjusting module 200 such that the brightness adjusting module 200 realizes an electrical connection between the light-emitting device D1 and the voltage output module 100. In such a way, the first voltage signal V1 outputted by the voltage output module 100 can apply to the cathode (i.e., Point A) of the light-emitting device via the brightness adjusting module 200, as shown in FIG. 1A. The voltage value of the second voltage signal V2 is greater than the voltage value of the first voltage signal V1.

Figure 1B:
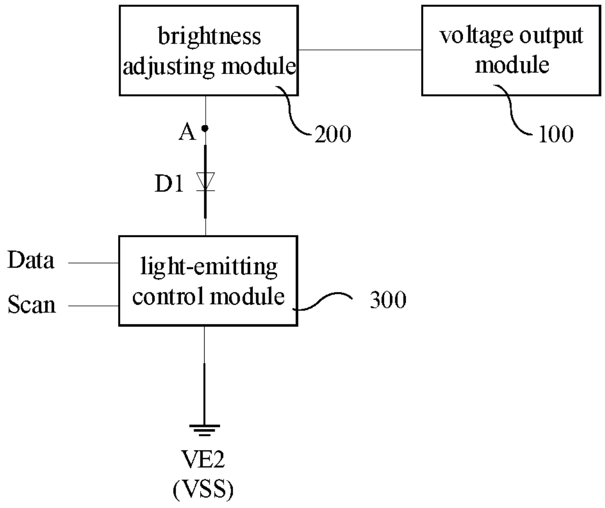

For more details, if the second voltage terminal VE2 is the common grounded terminal VSS, a cathode of the light-emitting device D1 is electrically connected to the common grounded terminal VSS, an anode of the light-emitting device D1 is electrically connected to the brightness adjusting module 200 such that the brightness adjusting module 200 realizes an electrical connection between the light-emitting device D1 and the voltage output module 100. In such a way, the first voltage signal V1 outputted by the voltage output module 100 can apply to the anode (i.e., Point A) of the light-emitting device via the brightness adjusting module 200, as shown in FIG. 1B. The voltage value of the second voltage signal V2 is less than the voltage value of the first voltage signal V1.

The brightness adjusting module 200 is configured to control a frequency the first voltage signal V1 applies to the light-emitting device D1 in a light-emitting phase. By controlling the frequency the first voltage signal V1 applies to the light-emitting device D1, it can make the light-emitting device D1 change between a light-emitting state and a non-light-emitting state. In such a way, on a basis of certain brightness levels the light-emitting device D1 originally have in the light-emitting phase, average brightness of the light-emitting device D1 is further adjusted, thereby increasing the number of brightness adjustable levels of the light-emitting device D1.

Specifically, by taking the second voltage terminal VE2 as the common grounded terminal VSS for example with reference to FIGS. 1C to 1F, the structures and operational principles of the driving circuit are illustrated as below. The structures and operational principles of the driving circuit taking the second voltage terminal VE2 as the power supply terminal VDD of the device are similar to the structures and operational principles of the driving circuit taking the second voltage terminal VE2 as the common grounded terminal VSS and are not repeated herein.

The brightness adjusting module 200 includes a first transistor T1 and a control unit 201.

The first transistor T1 is electrically connected between the light-emitting device D1 and the voltage output module 100. The first transistor T1 is configured to apply the first voltage signal V1 to the anode of the light-emitting device D1. Specifically, one of the source and the drain of the first transistor T1 is electrically connected to the anode of the light-emitting device D1 and the other one of the source and the drain of the first transistor T1 is electrically connected to the voltage output module 100.

The control unit 201 is electrically connected to the gate of the first transistor T1. The control unit 201 is configured to control switching on and off the first transistor T1 and utilize switching on and off states of the first transistor T1 to adjust the frequency the first voltage signal V1 applies to the light-emitting device D1.

Optionally, the control unit 201 includes a Field-Programmable Gate Array (FPGA). The voltage output module 100 can adopt a voltage lowering drive chip (i.e., a Buck IC).

Figure 1C:
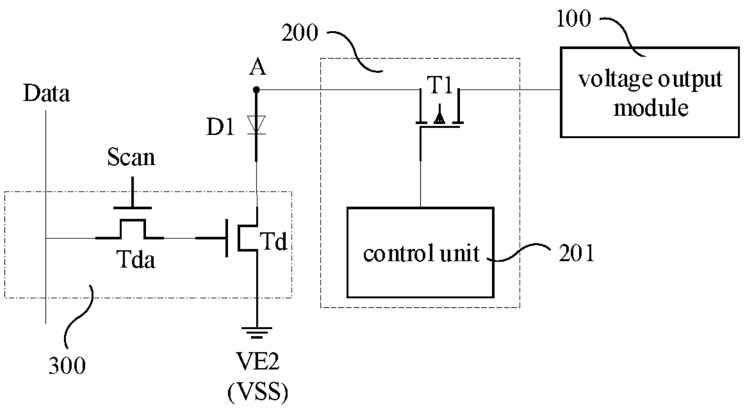
Figure 1D:
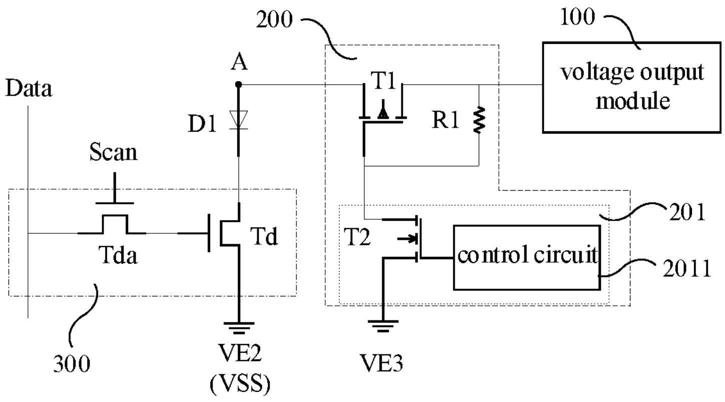

For more details, referring to FIG. 1D, the control unit 201 further includes a second transistor T2 and a control circuit 2011.

The second transistor T2 is electrically connected between a third voltage terminal VE3 and the gate of the first transistor T1. The second transistor T2 is configured to control switching on and off the first transistor T1 based on a brightness adjusting signal EC. Specifically, one of the source and the drain of the second transistor T2 is connected to the gate of the first transistor T1 and the other one of the source and the drain of the second transistor T2 is connected to the third voltage terminal VE3. Optionally, the third voltage terminal VE3 can be an alternating-current (AC) power supply terminal and can also be a direct-current (DC) power supply terminal. Further, when the third voltage terminal VE3 is a DC voltage terminal and the first transistor T1 is a P-type transistor, the third voltage terminal VE3 can have a same potential as the second voltage terminal VE2, that is, both the second voltage terminal VE2 and the third voltage terminal VE3 are common grounded terminals VSS.

The control circuit 2011 is configured to generate the brightness adjusting signal EC and control switching on and off the second transistor T2. In such a way, it is realized a control over the frequency the first voltage signal V1 applies to the light-emitting device D1. Specifically, the control circuit 2011 is electrically connected to the gate of the second transistor T2. Optionally, the control circuit 2011 is a Field-Programmable Gate Array (FPGA).

Figure 1E:
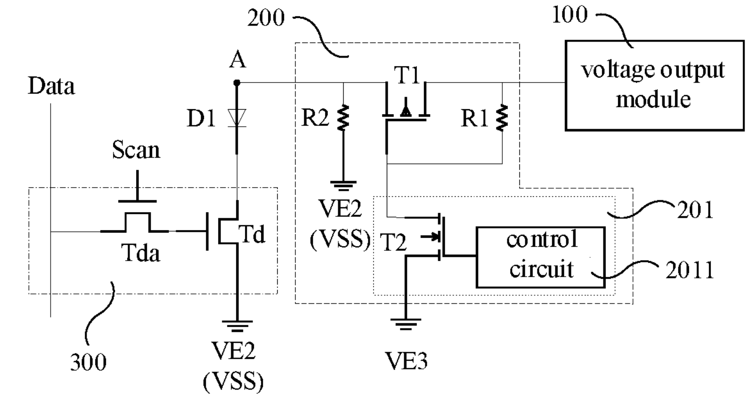
Figure 1F:
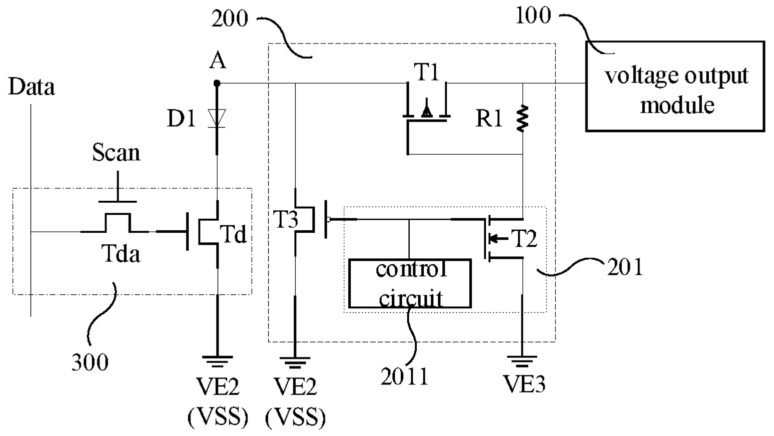

For more details, referring to FIGS. 1D to 1F, the brightness adjusting module 200 further includes a first resistor R1 connected in series between the voltage output module 100 and the gate of the first transistor T1.

For more details, referring to FIG. 1E, the brightness adjusting module 200 further includes a second resistor R2 connected in series between the light-emitting device D1 and the second voltage terminal VE2 and between the first transistor T1 and the second voltage terminal VE2 such that the switching-off process of the light-emitting device D1 is accelerated when the first transistor T1 is switched off. It can be understood that the resistance of the first resistor R1 and the second resistor R2 can be configured according to actual needs.

In addition, it can also use a transistor to realize the acceleration of the switching-off process of the light-emitting device D1. That is, referring to FIG. 1F, the brightness adjusting module 200 further includes a third transistor T3 electrically connected between the light-emitting device D1 and the second voltage terminal VE2. The third transistor T3 is configured to make the voltages at two ends of the light-emitting device D1 be equal to each other, thereby accelerating the switching-off process of the light-emitting device D1. Specifically, one of the source and the drain of the third transistor T3 is electrically connected to the anode of the light-emitting device D1 and the other one of the source and the drain of the third transistor T3 is electrically connected to the second voltage terminal VE2.

Optionally, the gate of the third transistor T3 can be electrically connected to the control circuit 2011 such that the control circuit 2011 controls switching on and off the third transistor T3. Further, in order to avoid a conflict between applying the first voltage signal V1 to the anode of the light-emitting device D1 and applying the second voltage signal V2 to the anode of the light-emitting device D1, the first transistor T1 and the third transistor T3 cannot be switched on at the same time. Therefore, when the second transistor T2 and the third transistor T3 are controlled by the brightness adjusting signal EC generated by the control circuit 2011, the second transistor T2 and the third transistor T3 are different in types, that is, the second transistor T2 is one of a P-type transistor and a N-type transistor and the third transistor T3 is the other one of the P-type transistor and the N-type transistor.

Referring to FIGS. 1A to 1F, the driving circuit further includes a light-emitting control module 300 configured to control illumination of the light-emitting device D1 based on a scan signal Sn loaded via a scan line Scan and a data signal Vdata loaded via a data line Data, thereby making the light-emitting device D1 be in the light-emitting phase.

Optionally, the light-emitting control module 300 includes a drive transistor Td and a data transistor Tda.

The drive transistor Td is electrically connected between the light-emitting device and the second voltage terminal VE2. The drive transistor Td is configured to generate, based on the data signal Vdata, a driving current used to drive the light-emitting device D1 to emit light. Specifically, one of the source and the drain of the drive transistor Td is electrically connected to the anode or the cathode of the light-emitting device D1 and the other one of the source and the drain of the drive transistor Td is electrically connected to the second voltage terminal VE2. The second voltage terminal V2 can be a common grounded terminal VSS and can also be a power supply terminal VDD of a device.

The data transistor Tda is electrically connected between the data line Data and the drive transistor Td. The data transistor Tda is configured to control switching on and off the drive transistor Td based on the scan signal Sn. Optionally, one of the source and the drain of the data transistor Tda is connected to the gate of the drive transistor Td and the other one of the source and the drain of the data transistor Tda is connected to the data line Data, and the gate of the data transistor Tda is electrically connected to the scan line Scan.

It can be understood that the light-emitting control module 300 is not limited to 2T shown in FIGS. 1C to 1F, that is, the light-emitting control module 300 can also be 2T1C, 5T1C, 7T1C or 7T2C. T represents a transistor and C represents a capacitor.

In the driving circuit, the first transistor T1, the second transistor T2, the third transistor T3, the drive transistor Td and the data transistor Tda can be field-effect transistors. Further, the field-effect transistors include metal-oxide-semiconductor field-effect transistors (MOSFETs) or thin-film transistors (TFTs). Optionally, the first transistor T1 and/or the second transistor T2 are MOSFETs and the drive transistor Td and the data transistor Tda are TFTs.

Figure 2A:
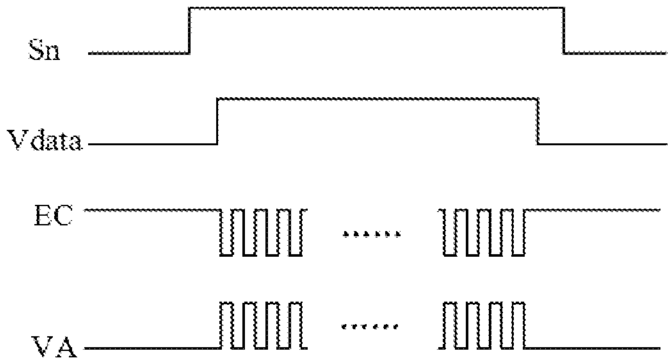
FIGS. 2A and 2B are diagrams illustrating corresponding control timing of the driving circuits shown in FIGS. 1C to 1F.
Figure 2B:
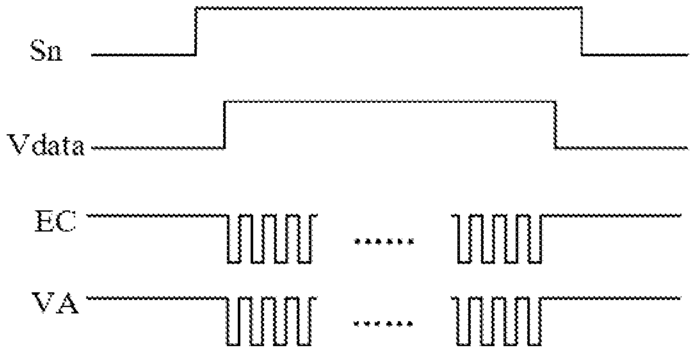

FIGS. 2A and 2B are diagrams illustrating corresponding control timing of the driving circuits shown in FIGS. 1C to 1F. The operational principles of the driving circuits shown in FIGS. 1C to 1F are illustrated below by taking the first transistor T1 and the third transistor T3 as P-type transistors and the second transistor T2, the drive transistor Td and the data transistor Tda as N-type transistors, for example.

Specifically, referring to FIGS. 1C and 2A, the data transistor Tda is switched on when the scan signal Sn loaded via the scan line Scan is at high level, and the drive transistor Td is switched on when the data signal Vdata loaded via the data line Data is at high level. This makes the driving circuit be in the light-emitting phase. In this period, if the brightness adjusting signal EC provided to the gate of the first transistor T1 by the control unit 201 is at high level, the first transistor T1 is switched off and the light-emitting device D1 does not emit light. If the brightness adjusting signal EC provided to the gate of the first transistor T1 by the control unit 201 is at low level, the first transistor T1 is switched on and the first voltage signal V1 outputted by the voltage output module 100 is transmitted to the anode (i.e., Point A) of the light-emitting device D1. There is a voltage difference existing between two ends of the light-emitting device D1. The light-emitting device D1 emits light based on a driving current generated by the drive transistor Td, that is, the intensity of the light emitted by the light-emitting device D1 is still determined based on the the data signal Vdata at this time. After that, the brightness adjusting signal EC is changed from low level to high level and then from high level to low level, and loops like this such that the light-emitting device D1 is continuously changed between the non-light-emitting state and the light-emitting state. This is ended when at least one of the data signal Vdata and the scan signal Sn. The drive transistor Td is switched off, and the light-emitting phase of the driving circuit is terminated.

The time length of each low-level pulse in the brightness adjusting signal EC decides an effective time length each time the first voltage signal V1 applies to the light-emitting device D1, thereby determining the time length each time the light-emitting device D1 emits light. The time length of each high-level pulse in the brightness adjusting signal EC decides the time length each time the light-emitting device D1 is in the non-light-emitting state. The changes of the potential at Point A are indicated by VA shown in FIG. 2A.

Although the light intensity each time the light-emitting device D1 is in the light-emitting state is determined by the data signal Vdata, the light-emitting device D1 is switched between the light-emitting state and the non-light-emitting state during the whole light-emitting phase. Feeling of bright and dark perceived by human eyes will fuse together, thereby generating a constant feeling of average brightness. Therefore, on a basis of certain brightness levels the light-emitting device D1 originally have in the light-emitting phase, the number of brightness adjustable levels of the light-emitting device D1 can be further improved.

It can be understood that in the light-emitting phase, the longer the period of changes in the brightness adjusting signal EC, the lower the frequency the first voltage signal V1 applies to the light-emitting device D1. Therefore, in order to increase the frequency the first voltage signal V1 applies to the light-emitting device D1, it can be controlled the period in the brightness adjusting signal EC, that is, the number of low-level pulses and the time length of each of the pulses and the number of high-level pulses and the time length of each of the pulses in the brightness adjusting signal EC can be adjusted in the light-emitting phase. In such a way, the frequency the first voltage signal V1 applies to the light-emitting device D1 satisfies the needs of the number of brightness levels. Optionally, the time length of a low-level part of the brightness adjusting signal EC occupied in the light-emitting phase can be unequal to the time length of a high-level part of the brightness adjusting signal EC occupied in the light-emitting phase. That is, the duty ratio (i.e., a ratio of the time length of the high-level part of the brightness adjusting signal EC to the time length of the light-emitting phase) of the brightness adjusting signal EC can be adjusted based on actual needs. For example, a first brightness is obtained when the duty ratio of the brightness adjusting signal EC is 10%; a second brightness is obtained when the duty ratio is 20%; a third brightness is obtained when the duty ratio is 30%; a fourth brightness is obtained when the duty ratio is 40%, and so on. The first brightness, the second brightness, the third brightness and the fourth brightness represent different brightness. In such a way, the needs of different numbers of brightness levels are satisfied by adjusting the duty ratio of the brightness adjusting signal EC. It can be understood that the number of adjustable levels of the light-emitting device D1 each time the driving circuit obtains in the light-emitting phase may differ based on different data signal Vdata and/or the frequency the first voltage signal V1 applies to the light-emitting device D1 and/or the effective total time length the first voltage signal V1 applies to the light-emitting device D1. The effective total time length the first voltage signal V1 applies to the light-emitting device D1 is referred to a total of all the effective time lengths, where each effective time length corresponds to each time the first voltage signal V1 applies to the light-emitting device D1 in the light-emitting phase.

Likewise, the operational principles of the driving circuits shown in FIGS. 1D to 1F can be further obtained. Specifically, referring to FIGS. 1D and 2B, the data transistor Tda is switched on when the scan signal Sn loaded via the scan line Scan is at high level, and the drive transistor Td is switched on when the data signal Vdata loaded via the data line Data is at high level. This makes the driving circuit be in the light-emitting phase. In this period, if the brightness adjusting signal EC provided to the gate of the second transistor T2 by the control circuit 2011 is at low level, the second transistor T2 is switched off, the first transistor T1 is also switched off and the light-emitting device D1 does not emit light. If the brightness adjusting signal EC provided to the gate of the second transistor T2 by the control circuit 2011 is at high level, the second transistor T2 is switched on, a third voltage signal loaded from the third voltage terminal VE3 is a low level signal, the third voltage signal is transmitted to the gate of the first transistor T1, the first transistor T1 is switched on, the first voltage signal V1 outputted by the voltage output module 100 is transmitted to the anode (i.e., Point A) of the light-emitting device D1. There is a voltage difference existing between two ends of the light-emitting device D1. The light-emitting device D1 emits light based on a driving current generated by the drive transistor Td. After that, the brightness adjusting signal EC is changed from high level to low level and then from low level to high level, and loops like this such that the second transistor T2 is continuously switched between a switched-off state and a switched-on state. In such a way, the first transistor T1 is continuously switched between the switched-off state and the switched-on state, and the light-emitting device D1 is continuously changed between the non-light-emitting state and the light-emitting state. This is ended when at least one of the data signal Vdata and the scan signal Sn. The drive transistor Td is switched off, and the light-emitting phase of the driving circuit is terminated.

Specifically, referring to FIGS. 1E and 2B, the data transistor Tda is switched on when the scan signal Sn loaded via the scan line Scan is at high level, and the drive transistor Td is switched on when the data signal Vdata loaded via the data line Data is at high level. This makes the driving circuit be in the light-emitting phase. In this period, if the brightness adjusting signal EC provided to the gate of the second transistor T2 by the control circuit 2011 is at low level, the second transistor T2 is switched off, the first transistor T1 is also switched off. Two ends of the second resistor R2 are connected in series with the light-emitting device D1 and the second voltage terminal VE2. Therefore, there is no current flowing through the light-emitting device D1, and thus the light-emitting device D1 does not emit light. If the brightness adjusting signal EC provided to the gate of the second transistor T2 by the control circuit 2011 is at high level, the second transistor T2 is switched on, a third voltage signal loaded from the third voltage terminal VE3 is a low level signal, the third voltage signal is transmitted to the gate of the first transistor T1, the first transistor T1 is switched on, the first voltage signal V1 outputted by the voltage output module 100 is transmitted to the anode (i.e., Point A) of the light-emitting device D1. There is a voltage difference existing between two ends of the light-emitting device D1. The light-emitting device D1 emits light based on a driving current generated by the drive transistor Td. After that, the brightness adjusting signal EC is changed from high level to low level and then from low level to high level, and loops like this such that the second transistor T2 is continuously switched between a switched-off state and a switched-on state. In such a way, the first transistor T1 is continuously switched between the switched-off state and the switched-on state, and the light-emitting device D1 is continuously changed between the non-light-emitting state and the light-emitting state. This is ended when at least one of the data signal Vdata and the scan signal Sn. The drive transistor Td is switched off, and the light-emitting phase of the driving circuit is terminated.

Specifically, referring to FIGS. 1F and 2B, the data transistor Tda is switched on when the scan signal Sn loaded via the scan line Scan is at high level, and the drive transistor Td is switched on when the data signal Vdata loaded via the data line Data is at high level. The drive transistor Td generates a driving current driving the light-emitting device D1 to emit light such that the driving circuit is in the light-emitting phase. In this period, if the brightness adjusting signal EC provided to the gate of the second transistor T2 by the control circuit 2011 is at low level, the second transistor T2 is switched off, the first transistor T1 is also switched off, and the third transistor T3 is switched on. The switched-on third transistor T3 and the switched-on drive transistor Td make both the two ends of the light-emitting device D1 electrically connect to the second voltage terminal VE2. Therefore, there is no current flowing through the light-emitting device D1, and thus the light-emitting device D1 does not emit light. If the brightness adjusting signal EC provided to the gate of the second transistor T2 by the control circuit 2011 is at high level, the second transistor T2 is switched on, a third voltage signal loaded from the third voltage terminal VE3 is a low level signal, the third voltage signal is transmitted to the gate of the first transistor T1, the first transistor T1 is switched on, the first voltage signal V1 outputted by the voltage output module 100 is transmitted to the anode (i.e., Point A) of the light-emitting device D1. There is a voltage difference existing between two ends of the light-emitting device D1. The light-emitting device D1 emits light based on a driving current generated by the drive transistor Td. After that, the brightness adjusting signal EC is changed from high level to low level and then from low level to high level, and loops like this such that the second transistor T2 is continuously switched between a switched-off state and a switched-on state and the third transistor T3 is continuously switched between the switched-on state and the switched-off state. In such a way, the first transistor T1 is continuously switched between the switched-off state and the switched-on state, and the light-emitting device D1 is continuously changed between the non-light-emitting state and the light-emitting state. This is ended when at least one of the data signal Vdata and the scan signal Sn. The drive transistor Td is switched off, and the light-emitting phase of the driving circuit is terminated.

Figure 3A:
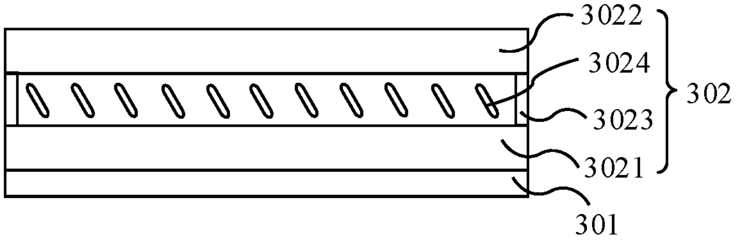
FIGS. 3A and 3B are structural schematic diagrams illustrating display panels provided in embodiments of the present application.
Figure 3B:
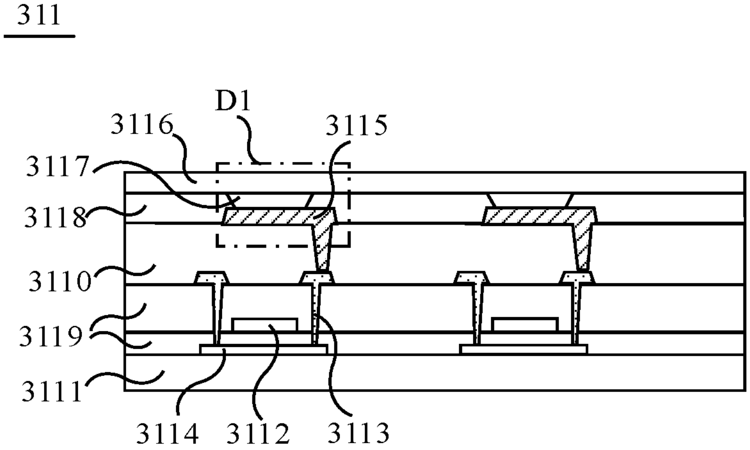

FIGS. 3A and 3B are structural schematic diagrams illustrating display panels provided in embodiments of the present application. The present application further provides a display panel including any of the afore-described driving circuits.

Optionally, the display panel includes a passive-illuminating display panel, a self-illuminating display panel, a quantum-dot display panel, and etc.

Specifically, as shown in FIG. 3A, the display panel is a passive-illuminating display panel. The display panel includes a backlight module 301 and a panel body 302 located on the backlight module 301. The backlight module 301 can be an edge backlight module or a direct backlight module. The backlight module 301 includes the driving circuit. The light-emitting device D1 is used as a backlight source so as to provide backlight for the panel body 302. The display function of the display panel is realized by cooperation between the backlight module 301 and the panel body 302.

For more details, the panel body 302 further includes an array substrate 3021, a color filter substrate 3022, and frame adhesive 3023 and liquid crystal 3024 located between the array substrate 3021 and the color filter substrate 3022. In addition, the panel body 302 further includes polarizers, pixel electrodes, common electrode, touch control electrodes, alignment layers, and etc., which are not shown.

Specifically, as shown in FIG. 3B, the display panel is a self-illuminating display panel. The display panel includes a panel body 311. The panel body 311 includes a plurality of driving circuits. A plurality of light-emitting devices D1 are taken as a plurality of subpixels such that the display function of the display panel is realized when the plurality of light-emitting devices D1 emit light.

For more details, the panel body 311 includes a substrate 3111, and a first metal layer 3112, a second metal layer 3113, an active layer 3114, a first electrode layer 3115, a second electrode layer 3116 and a light-emitting layer 3117 that are located above the substrate 3111, and a pixel definition layer 3118, an insulating layer 3119 and a flattening layer 3110. The first metal layer 3112 includes a gate disposed aligning with the active layer 3114. The gate corresponds to the gate of each transistor in the driving circuit. The second metal layer 3113 includes a source and a drain electrically connected to the active layer 3114. The source and the drain correspond to the source and the drain of each transistor in the driving circuit. The light-emitting layer 3117 is located between the first electrode layer 3115 and the second electrode layer 3116, and located in a pixel definition area of the pixel definition layer 3118. The first electrode layer 3115 includes a first electrode and the second electrode layer 3116 includes a second electrode. Each light-emitting device D1 includes the first electrode, the second electrode and the light-emitting layer 3117. One of the first electrode and the second electrode is electrically connected to a transistor in the driving circuit. Optionally, the panel body 311 further includes a color filter layer, a touch electrode, a sensor, and etc., which are not shown.

The present application further provides an electronic device including any of the afore-described driving circuits or any of the afore-described display panels.

Optionally, the electronic device includes an activity band, a thermoprobe, a computer, a cell phone, and etc.

Hereinbefore, the embodiments of the present application are introduced in detail, the principles and implementations of the present application are set forth herein with reference to specific examples, descriptions of the above embodiments are merely served to assist in understanding the technical solutions and essential ideas of the present application. In addition, persons of ordinary skill in the art can make variations and modifications to the present application in terms of the specific implementations and application scopes according to the ideas of the present application. Therefore, the content of specification shall not be construed as a limit to the present application.

The invention claimed is:

1. A driving circuit, comprising:

a voltage output module, configured to output a first voltage signal;

a light-emitting device, electrically connected between the voltage output module and a second voltage terminal; and a brightness adjusting module, electrically connected between the light-emitting device and the voltage output module, configured to control a frequency the first voltage signal applies to the light-emitting device in a light-emitting phase to adjust average brightness of the light-emitting device, wherein the brightness adjusting module comprises:

a first transistor, wherein one of a source and a drain of the first transistor is electrically connected to the light-emitting device and another one of the source and the drain of the first transistor is electrically connected to the voltage output module; and a control unit, electrically connected to a gate of the first transistor;

wherein the brightness adjusting module further comprises a first resistor connected in series between the voltage output module and a gate of the first transistor.

2. The driving circuit according to claim 1, wherein the control unit comprises:

a second transistor, wherein one of the source and the drain of the second transistor is connected to a gate of the first transistor and another one of the source and the drain of the second transistor is connected to a third voltage terminal;

a control circuit, electrically connected to the gate of the second transistor.

3. The driving circuit according to claim 2, wherein the brightness adjusting module further comprises a second resistor connected in series between the light-emitting device and the second voltage terminal and between the first transistor and the second voltage terminal.

4. The driving circuit according to claim 2, wherein the brightness adjusting module further comprises a third transistor, one of the source and the drain of the third transistor is electrically connected to the light-emitting device and another one of the source and the drain of the third transistor is connected to the second voltage terminal, and the third transistor is configured to make voltages at two ends of the light-emitting device be equal to each other.

5. The driving circuit according to claim 4, wherein the control circuit is electrically connected to the gate of the third transistor, and the second transistor is one of a P-type transistor and a N-type transistor and the third transistor is another one of the P-type transistor and the N-type transistor.

6. The driving circuit according to claim 1, further comprising a light-emitting control module comprising:

a drive transistor, wherein one of a source and a drain of the drive transistor is electrically connected to the light-emitting device and another one of the source and the drain of the drive transistor is connected to the second voltage terminal;

a data transistor, wherein one of the source and the drain of the data transistor is connected to a gate of the drive transistor and another one of the source and the drain of the data transistor is connected to a data line, and the gate of the data transistor is electrically connected to a scan line.

7. The driving circuit according to claim 1, wherein the light-emitting device comprises an organic light-emitting diode (OLED), a mini light-emitting diode (mini LED) or a micro light-emitting diode (micro LED).

8. The driving circuit according to claim 1, wherein the second voltage terminal is a common grounded terminal or a power supply terminal of a device.

9. The driving circuit according to claim 1, wherein the control unit comprises a Field-Programmable Gate Array (FPGA).

10. A display panel, comprising a driving circuit comprising:

a voltage output module, configured to output a first voltage signal;

a light-emitting device, electrically connected between the voltage output module and a second voltage terminal; and a brightness adjusting module, electrically connected between the light-emitting device and the voltage output module, configured to control a frequency the first voltage signal applies to the light-emitting device in a light-emitting phase to adjust average brightness of the light-emitting device, wherein the brightness adjusting module comprises:

a first transistor, wherein one of a source and a drain of the first transistor is electrically connected to the light-emitting device and another one of the source and the drain of the first transistor is electrically connected to the voltage output module;

a second transistor, wherein one of the source and the drain of the second transistor is connected to the gate of the first transistor and another one of the source and the drain of the second transistor is connected to a third voltage terminal; and a control circuit, electrically connected to the gate of the second transistor.

11. The display panel according to claim 10, wherein the brightness adjusting module further comprises a first resistor connected in series between the voltage output module and the gate of the first transistor; and a second transistor or a third transistor connected between the light-emitting device and the second voltage terminal and between the first transistor and the second voltage terminal.

12. The display panel according to claim 10, wherein the driving circuit further comprises a light-emitting control module comprising:

a drive transistor, wherein one of a source and a drain of the drive transistor is electrically connected to the light-emitting device and another one of the source and the drain of the drive transistor is connected to the second voltage terminal;

a data transistor, wherein one of the source and the drain of the data transistor is connected to a gate of the drive transistor and another one of the source and the drain of the data transistor is connected to a data line, and the gate of the data transistor is electrically connected to a scan line.

13. The display panel according to claim 10, further comprising a backlight module comprising the light-emitting device.

14. The display panel according to claim 10, further comprising a panel body comprising the light-emitting device.

15. An electronic device, comprising a display panel comprising a driving circuit, which comprises:

a voltage output module, configured to output a first voltage signal;

a light-emitting device, electrically connected between the voltage output module and a second voltage terminal; and a brightness adjusting module, electrically connected between the light-emitting device and the voltage output module, configured to control a frequency the first voltage signal applies to the light-emitting device in a light-emitting phase to adjust average brightness of the light-emitting device, wherein the brightness adjusting module comprises:

a first transistor, wherein one of a source and a drain of the first transistor is electrically connected to the light-emitting device and another one of the source and the drain of the first transistor is electrically connected to the voltage output module;

a second transistor, wherein one of the source and the drain of the second transistor is connected to the gate of the first transistor and another one of the source and the drain of the second transistor is connected to a third voltage terminal;

a control circuit, electrically connected to the gate of the second transistor;

a first resistor, connected in series between the voltage output module and the gate of the first transistor; and a second transistor or a third transistor connected between the light-emitting device and the second voltage terminal and between the first transistor and the second voltage terminal.

16. The electronic device according to claim 15, wherein the driving circuit further comprises a light-emitting control module comprising:

a drive transistor, wherein one of a source and a drain of the drive transistor is electrically connected to the light-emitting device and another one of the source and the drain of the drive transistor is connected to the second voltage terminal;

a data transistor, wherein one of the source and the drain of the data transistor is connected to a gate of the drive transistor and another one of the source and the drain of the data transistor is connected to a data line, and the gate of the data transistor is electrically connected to a scan line.

* * * * *